Oct. 17, 1950 — C. F. McGREGOR — 2,525,819
RADIUS TOOL
Filed May 2, 1946 — 3 Sheets-Sheet 2
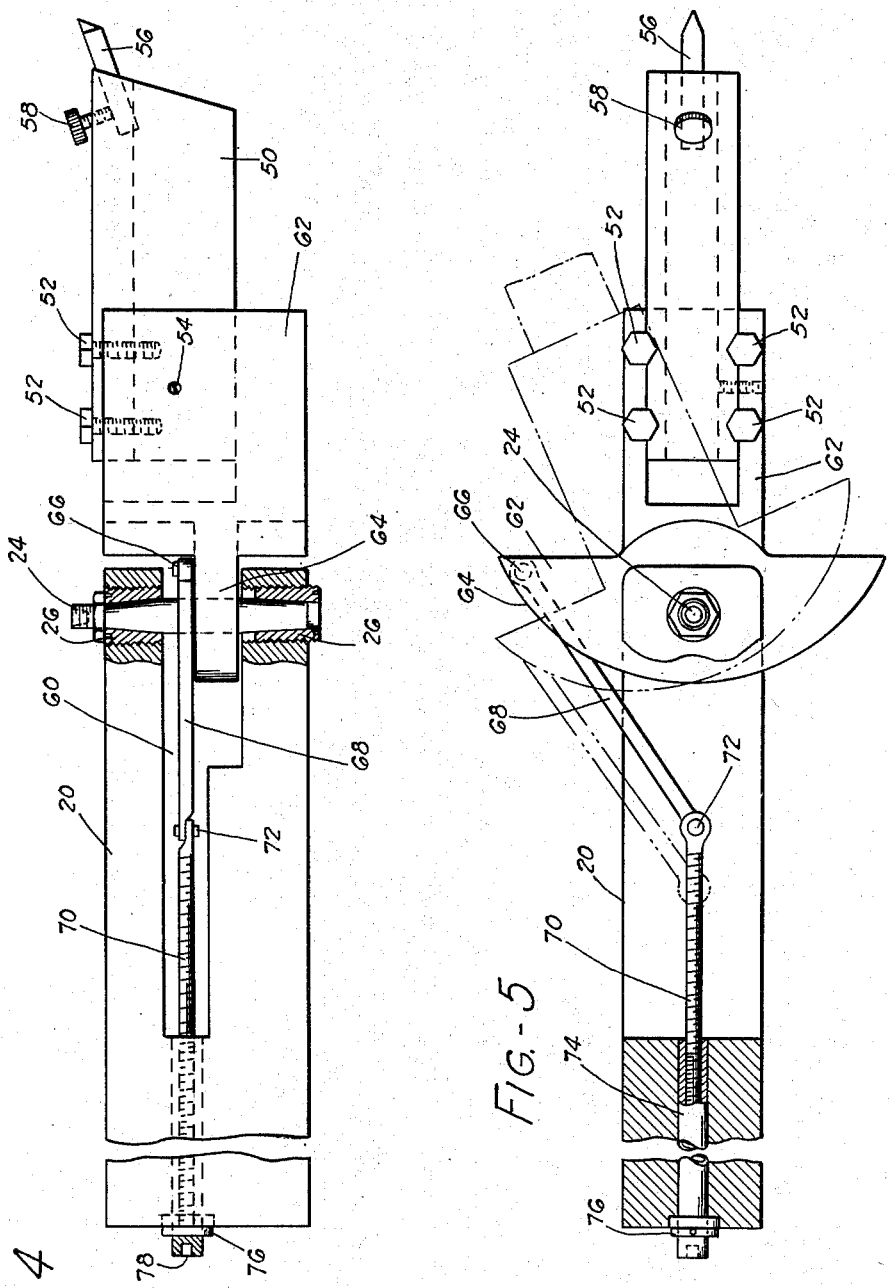
INVENTOR.
CARLTON F. McGREGOR
BY Victor J. Evans & Co.
ATTORNEYS Oct. 17, 1950     C. F. McGREGOR     2,525,819
RADIUS TOOL
Filed May 2, 1946                             3 Sheets-Sheet 3
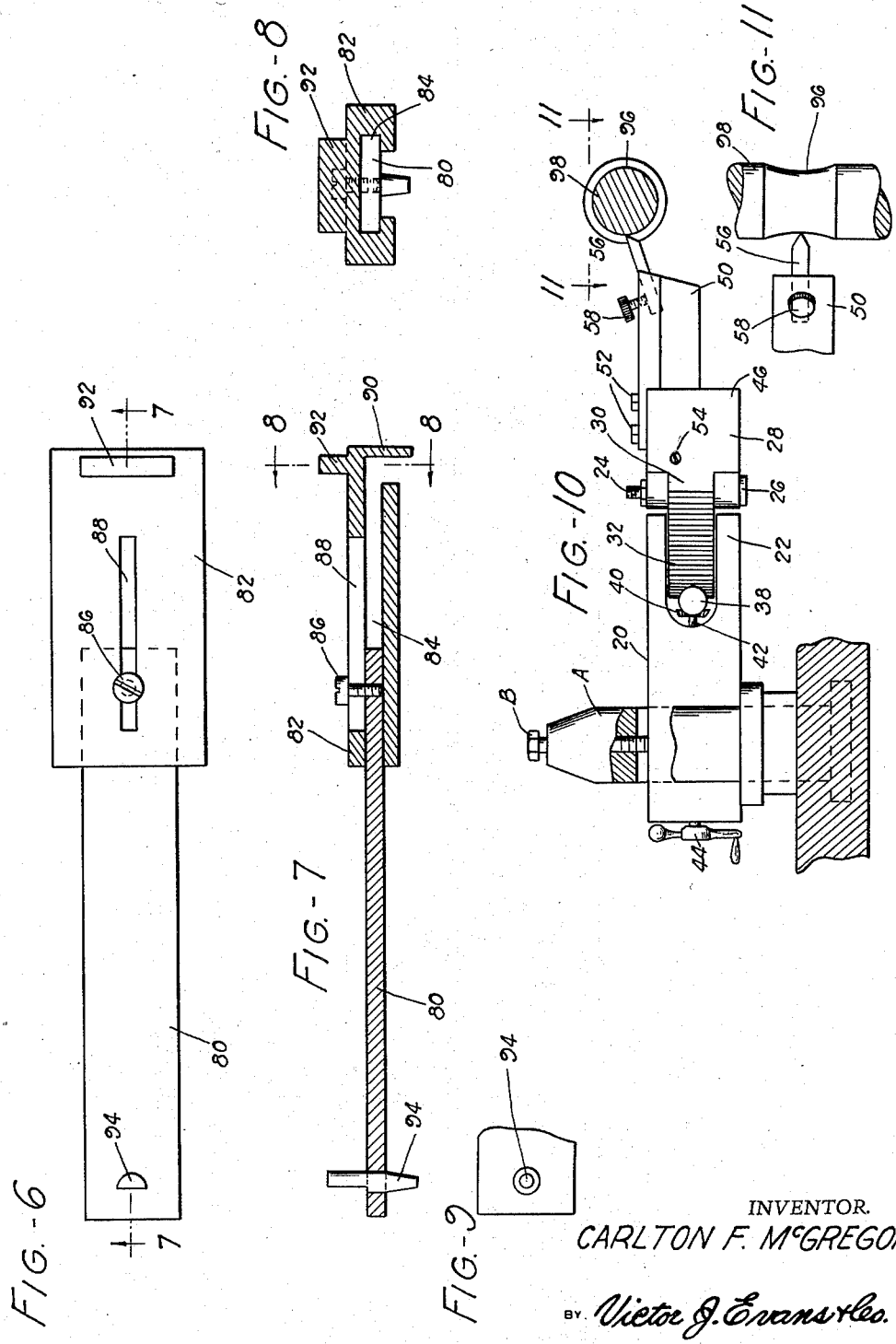
INVENTOR.
CARLTON F. McGREGOR
BY *Victor J. Evans & Co.*
ATTORNEYS Patented Oct. 17, 1950

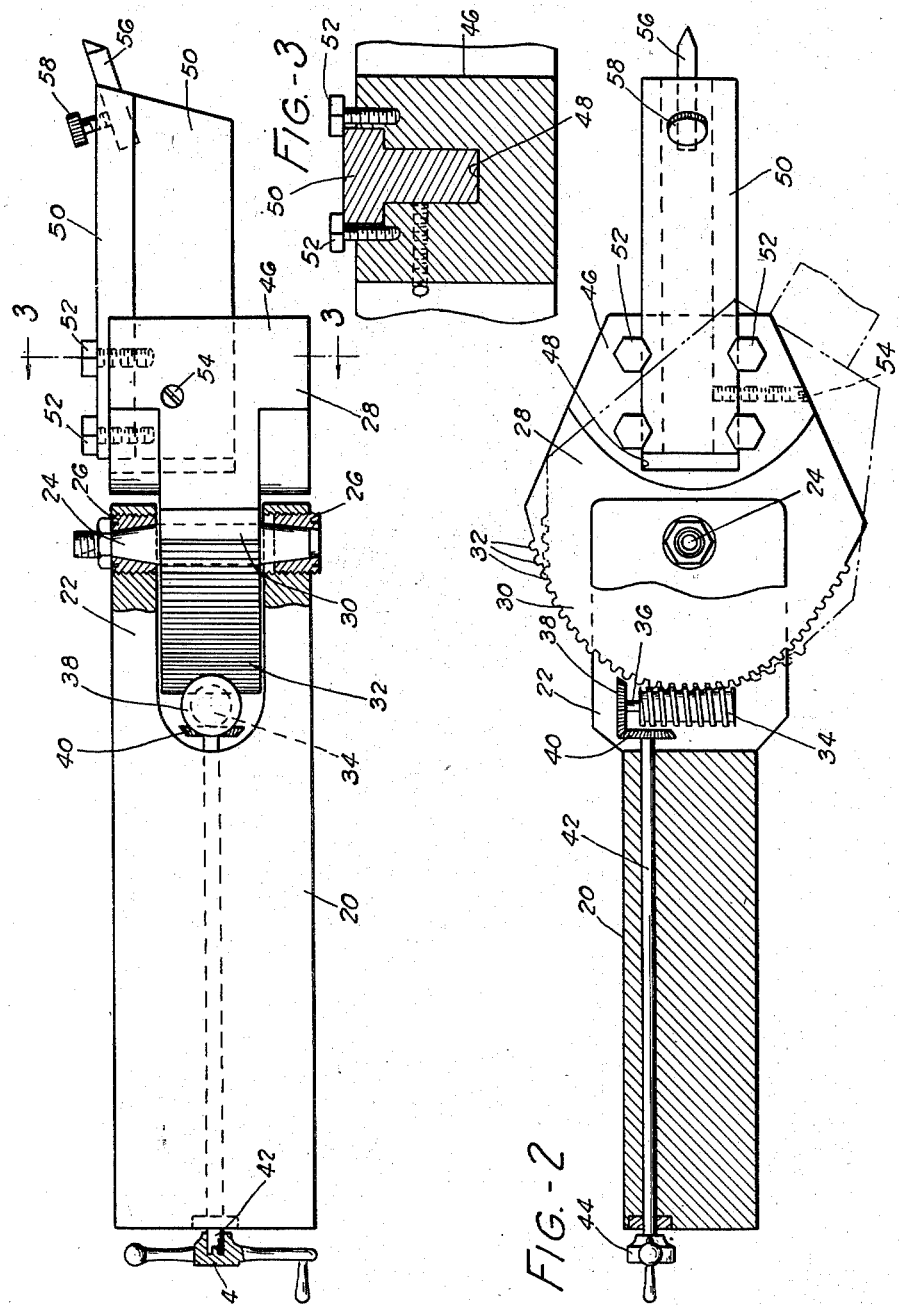

2,525,819

UNITED STATES PATENT OFFICE 2,525,819

RADIUS TOOL

Carlton F. McGregor, Erie, Pa.; Lucille E. Pawson trustee of said Carlton F. McGregor, deceased Application May 2, 1946, Serial No. 666,624

1 Claim. (Cl. 29—98)

This invention relates to a radius tool and more particularly to a tool that can be attached to lathes, planers, shapers boring mills or other similar machines for cutting precision radii in metals, plastics, wood or other material.

An object of the invention is to provide a tool which is manually adjustable about an axis lying vertically inclined with relation to the plane of the tool.

Another object of the invention is to provide a tool that is simple in design, durable in use and efficient in operation that can be inexpensively manufactured.

With the above and other objects and advantages in view the invention consists of the novel details of construction, arrangement and combination of parts more fully hereinafter described, claimed and illustrated in the accompanying drawings in which:

Figure 1 is an elevational view partly in section of an embodiment of the invention;

Figure 2 is a plan view thereof partly in section

Figure 3 is a sectional view on the line 3—3 of Figure 1;

Figure 4 is an elevational view of a modified form of the invention;

Figure 5 is a plan view thereof partly in section

Figure 6 is a plan view of a tool setting gauge

Figure 7 is a sectional view on the line 7—7 of Figure 6;

Figure 8 is a sectional view on the line 8—8 of Figure 7;

Figure 9 is a fragmentary detailed view of the bottom of the pin on the gauge;

Figure 10 shows the tool mounted in a lathe tool post and

Figure 11 is a sectional view on the line 11—11 of Figure 10.

Referring more in detail to the drawings the reference numeral 20 designates the shank of the tool which is supported in the tool post A and retained therein by the set screw B extending downwardly from the top of the post.

The shank 20 is provided with an enlarged bifurcated head 22 having a tapered pin 24 adjustably mounted therein adjacent the forward end thereof by tapered threaded bushings 26.

Mounted for rotation on the pin 24 is the tool stock 28 having the rear arcuate shaped portion 30 provided with teeth 32 that mesh with the worm 34 mounted transversely of the head 22 by means of the shaft 36 on one end of which is secured a bevelled gear 38 adapted for engagement with a similar gear 40 mounted on the shaft 42 which is mounted in the shank 20 and extends longitudinally thereof.

Rotation of the shaft 42 is obtained by means of the crank arm 44 pinned to the free end thereof which when rotated will move the tool stock 28 in an arc about the axis of the pin 24.

Instead of the crank arm 44 a gear box of a motor may be attached to rotate the shaft by power means.

The tool stock 28 in the tapered end 46 thereof is provided with a vertical T-shaped slot 48 to receive the complementary shaped tool holder 50 which is retained in the slot 48 by bolts 52 engaging the upper edge thereof and bolt 54 engaging the side thereof.

The cutting tool 56 is mounted in angular relation in the forward end of the tool stock and adjustably retained therein by means of the set screw 58.

In the modification shown in Figures 4 and 5 the shank 20 is provided with the bifurcation 60 at one end thereof to receive the tool stock 62 having the arcuate portion 64, which is provided with the pin 66 on one end thereof and is mounted for oscillation on the tapered pin 24 mounted vertically in the shank 20 by means of the tapered threaded bushings 26.

A link 68 is connected at one end to the pin 66 on the tool stock 28 and at the other end to the screw 70 by a pin 72. The screw is threadably mounted for adjustment in the internally threaded sleeve 74 in the shank 20 and the screw 70 and sleeve 74 extend longitudinally of the shank. A bearing 76 on the outer end of the shaft mounts the shaft in the sleeve and the end of the shaft is notched at 78 to receive the crank arm 44 or the gear box of a power means. The tool holder 50 being mounted in the tool stock as previously described.

The gauge for the tool shown in Figures 6 to 9 inclusive comprises the body 80 on one end of which is mounted the tool holder 82 having the channel shaped recess 84 to receive the body 80 and a screw 86 in the body 80 engages the elongated slot 88 to adjustably mount the holder 82 on the body.

The forward end of the holder 82 is provided with the depending lip 90 and on the upper surface thereof is provided with an upstanding setting lug 92 which is used for micrometer or scale setting. The rear end of the body 80 is provided with a bearing pin 94 on the under surface thereof, which extending upwardly of the body 80 is in alinement with the lug 92 for micrometer or scale setting.

In Figures 10 and 11 the device is shown installed in the post A of a lathe and the radius 96 in the work 98 gives an example of the operation of the device.

In use the device is clamped in the tool post of a machine and the tool set for the desired radius, the tool post is then brought into the cutting position.

The shaft 42 is rotated which oscillates the tool stock on its axis. The setting gauge is used since projections on tools of this type are subject to damage impairing their accuracy. The pins are tapered to fit tapered bushings, which when adjusted will compensate for any wear thereto and the tool holder is adjustable with relation to the tool stock.

It is believed that the operation and construction of the device will be apparent to those skilled in the art and it is to be understood that changes in the details of construction, arrangement and combination of parts may be resorted to provided they fall within the spirit of the invention and the scope of the appended claim.

Having thus described the invention what is claimed as new and desired to be secured by Letters Patent is:

A tool of the character described, comprising a shank having a bifurcated end, a tool stock mounted in said end, an arcuate shaped rear portion on said tool stock within said bifurcated end and at right angles to the longitudinally extending axis of the shank, a toothed formation on the inner edge of the said arcuate shaped rear portion of the tool stock, a pivot bolt passing through the end of said shank and said tool stock to pivotally mount said tool stock in said bifurcated end, a bore in said shank extending longitudinally thereof, a shaft in said bore, a gear on the inner end of said shaft within the bifurcated end, an axle mounted transversely of said shank, a gear on one end of said axle engaging with the gear on said shaft, a worm on said shaft engaging with the rack on the tool stock, a hand operated crank on the outer end of said shaft for the rotation of said shaft to cause the movement of said tool stock, about the bolt, a T-shaped slot in said tool stock, to receive a complementary shaped tool holder and a cutting tool is adjustably mounted in said tool holder.

CARLTON F. McGREGOR.

REFERENCES CITED

The following references are of record in the file of this patent:

UNITED STATES PATENTS

| Number | Name | Date |
| --- | --- | --- |
| 800,972 | Black | Oct. 3, 1905 |
| 1,032,898 | Hane | July 16, 1912 |
| 1,666,109 | Sheberashenko | Apr. 17, 1928 |
| 1,715,844 | Kienzl | June 4, 1929 |

FOREIGN PATENTS

| Number | Country | Date |
| --- | --- | --- |
| 193,243 | Germany | Dec. 5, 1907 |